T. N. WILSON.
AEROPLANE STRUCTURE.
APPLICATION FILED OCT. 24, 1919.

1,374,700.

Patented Apr. 12, 1921.

T. N. WILSON.
AEROPLANE STRUCTURE.
APPLICATION FILED OCT. 24, 1919.
1,374,700.
Patented Apr. 12, 1921.
2 SHEETS-SHEET 2.
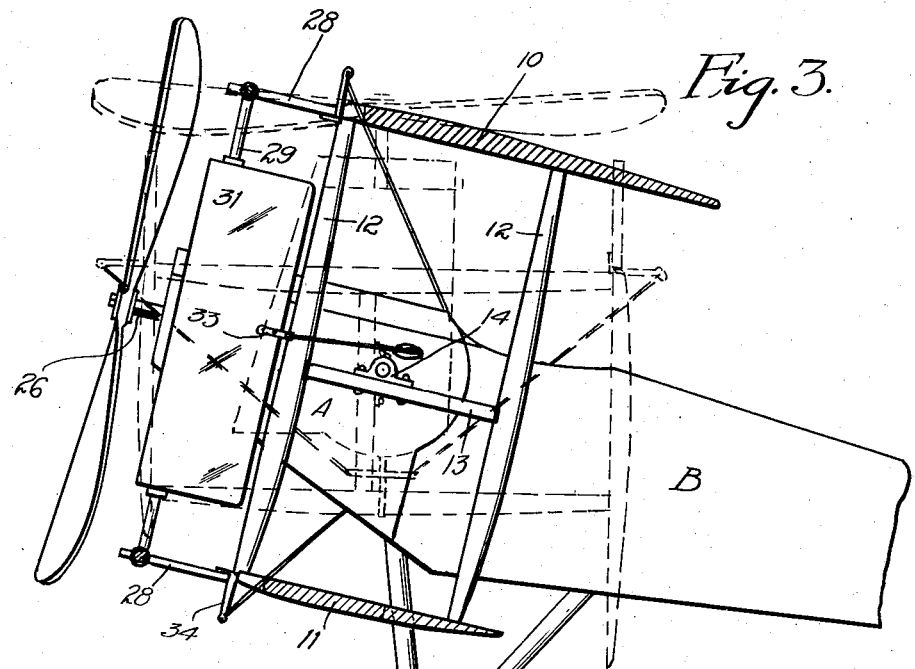
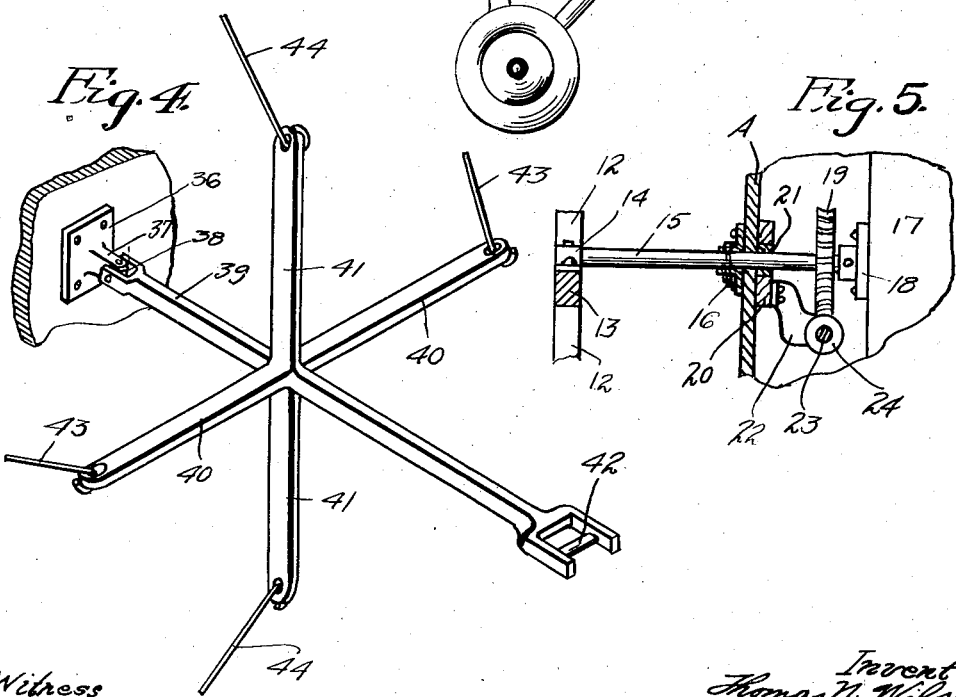
Witness
A. E. Jarvis
Inventor
Thomas N. Wilson
By Orwig & Barr Attys

UNITED STATES PATENT OFFICE.

THOMAS N. WILSON, OF CLARINDA, IOWA.

AEROPLANE STRUCTURE.

1,374,700. Specification of Letters Patent. Patented Apr. 12, 1921.

Application filed October 24, 1919. Serial No. 333,084.

*To all whom it may concern:*

Be it known that I, THOMAS N. WILSON, a citizen of the United States, residing at Clarinda, in the county of Page, State of Iowa, have invented a certain new and useful Aeroplane Structure, of which the following is a specification.

The object of my invention is to provide an aeroplane structure of simple, durable and inexpensive construction.

A further object of my invention is to provide an aeroplane structure, which may be so arranged that the aeroplane may start from the ground at a comparatively less speed than is at present required with aeroplanes, thereby eliminating a portion of the danger attendant upon starting and lessening the size of the field required.

With these and other objects in view, my invention consists in the construction, arrangement and combination of the various parts of the device, whereby the objects contemplated are attained as hereinafter more fully set forth, pointed out in my claims, and illustrated in the accompanying drawings, in which:

Fig. 3 shows a side elevation of the fuselage of my improved aeroplane, the wings being shown in section.

Fig. 4 shows a perspective view of my improved controlling lever; and

Fig. 5 shows an enlarged, vertical, sectional, detailed view illustrating a portion of the construction.

Figure 1:
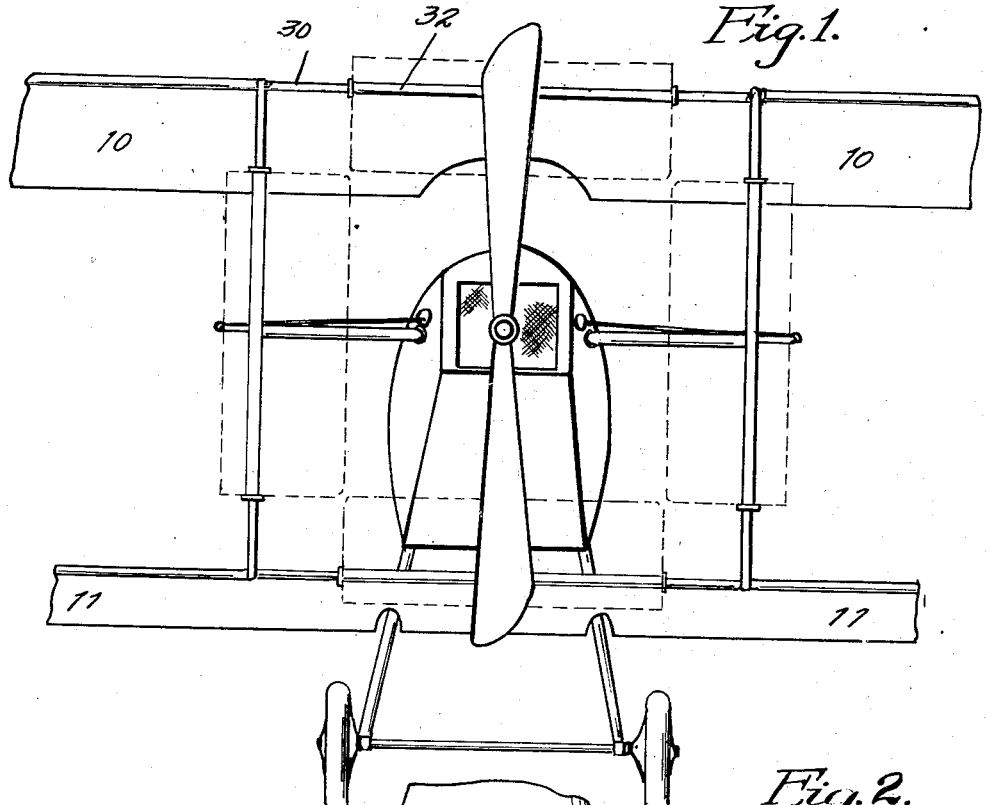
Figure 1 shows a front elevation of an aeroplane equipped with my improved device.

Referring to the accompanying drawings, I have used the reference numeral 10 to indicate generally the upper airfoil of my aeroplane and the reference numeral 11 to indicate the lower airfoil of my improved structure.

The airfoils 10 and 11 are connected together by spaced, vertical struts 12, which in turn are connected together adjacent to their central portions by a longitudinal brace or bar 13.

Fixed to the bar 13 is a clamp member 14 at or near its central part. It will be understood that bars 13 are provided at either side of the fuselage, and that the airfoils 10 and 11 are secured to the fuselage primarily by the coaction of these bars 13.

Fixed in each of the clamps 14 and extending into the fuselage are shafts 15, which are fixed to the forward part "A" of the fuselage structure in any suitable way by a gland or clamp 16.

At the inner end of the shafts 15, there are fixed to the engine beams 17 by a clamp 18. Adjacent to the clamp 18 a worm gear wheel 19 is fixed to the shafts 15.

It will be understood that I make my fuselage structure divisible. The forward part "A" being pivotally supported relative to the rear part "B" upon the center of the shafts 15, which are of course alined. A beam or brace 20 extends forwardly from the rear portion "B" adjacent to either side thereof, and carries a journal 21 in which the shafts 15 are pivotally mounted.

A bracket 22 fixed to and extending from the beams 20 carries a bearing in which a shaft 23 is journaled. The shaft 23 carries a worm 24, which meshes with the worm wheel 19, so that rotation of the shaft 23 will cause rotation of the worm wheel 19 thereby rotating the shafts 15 and rotation of the forward part "A" of the fuselage relative to the rear part "B" upon the centers of the shafts 15.

As the airfoils 10 and 11 are formed from the shafts 15 and rotate therewith, it will be seen that rotation of the shaft 23 will cause the portion "A" of the fuselage and the airfoils to rotate upon a transverse horizontal axis. Rotation of the forward part of the fuselage also causes a corresponding rotation of the engine 25, which is mounted in any suitable manner on the engine bed beams 17 and propeller shaft 26.

From the construction of the parts just described, it will be seen that by rotating the crank 27 at the rear end of the shaft 23, the forward portion of the fuselage and the airfoils may be rotated thereby permitting these parts to be moved substantially through an angle of ninety degrees, if so desired. The pilot of the machine may therefore when he is starting from the ground rotate the parts mentioned sufficiently to use the greatest possible amount of the thrust from the propeller for a direct lift on the machine.

If therefore an engine of sufficient power be installed in the portion "A" of the fuselage, it will be seen that that portion could be lifted straight up into the air instead of depending upon the lift exerted against the wings or airfoils, due to the forward movement of the machine over the ground.

The upper lift in such a case would be such that there would be little or no control over the machine when the propeller shaft is turned out of alinement with the longitudinal axis of the machine, so that I have provided the following controlling means for controlling the position of the machine when the propeller is so moved.

Extending forwardly from the airfoils 10 and 11 at either side of the fuselage are arms 28, between which are extended vertical and transverse bars 29 and 30. Upon the bars 29 and 30 are mounted steering planes 31 and 32. Extending outwardly from the planes 31 and 32 are pylons 33 and 34. Fixed to a suitable portion of the fuselage portion "A" is a transverse strut 35, which supports a plate 36 having a forwardly extending ear or lug 37 in which is pivotally mounted on a vertical axis a block 38, which in turn pivotally supports on a horizontal axis a forwardly extending lever 39.

The lug 37 and block 38 and lever 39 together will be seen to form the universal joint, which will permit movement of the lever 39 in any direction through a considerable arc.

Extending from the lever 39 intermediate of its ends are opposite arms 40 and 41. A handle device 42 is provided at the rear end of the lever 39. The arms 40 are connected by rigid rods 43 to the pylons 33 on the steering blades 31, and the arms 41 are connected by rigid rods 44 to the pylons 34 on the steering planes 32.

From the construction of the foregoing parts, it will be seen that movement of the handle 42 either up or down will cause a corresponding swinging of the steering planes 32 without materially affecting the position of the steering planes 31.

Movement of the handle 42 from side to side will through the arms 40, rods 43 and pylons 33 cause a swinging of the steering planes 31. Movement of the handle 42 on an inclined line will cause a swinging of both sets of steering planes corresponding to the angle of the line of movement of the handle relative to a vertical or horizontal line.

It will therefore be seen that when the forward portion of the fuselage "A" is rotated, thereby carrying with it the engine, propeller, and airfoils, the steering planes 31 and 32 will maintain a fixed position relative to the moving parts and be carried therewith, so that they may be operated in any of the positions of the movable parts to control the position of the machine.

For instance, even though the propeller shaft be moved through an angle of ninety degrees, the planes 31 and 32 would still be available, so that the movable parts could be held in position with the propeller shaft vertical.

In the practical use with my invention, it is intended that the aeroplane may, if desired, be launched into the air by first causing the front end of the fuselage to tilt upwardly to an almost vertical position, and there stand for an instant until such time as the pull of the propeller will cause the entire aeroplane to rise from this standing position up into the air in an almost vertical line, as distinguished from the practice heretofore commonly employed, of launching an aeroplane by running it parallel to the ground until a certain speed has been attained.

One of the great difficulties in connection with the launching of an aeroplane in the manner contemplated, is that when the front end of the fuselage is inclined from the ground upwardly to an almost vertical position, and before there is sufficient pull by the propeller to raise it bodily above the ground, the fuselage is liable to tilt forwardly, backwardly or to one side, which obviously would prevent the aeroplane from being properly launched.

It is for the purpose of overcoming this tilting tendency, and for giving the operator control over this tilting tendency, so that he may keep the aeroplane in a straight or almost vertical position, or tilted to one side or the other as he may desire, just prior to the instant when the aeroplane is launched, that I have provided the stabilizing planes 31 and 32 and their control mechanisms.

In connection with these stabilizing planes, and assuming that the aeroplane is standing in an upright position with the rear of its fuselage resting on the ground, and assuming further that the front end of the fuselage tends to tilt toward the left, then obviously if the stabilizing plane on the right should be placed in position where the current of air from the propeller would strike it forcibly, obviously this current of air striking the stabilizing plane to the right would tend to overcome the tilting tendency toward the left; and in the same way, if there is a tendency for the fuselage to tilt rearwardly, then if the operator should move the stabilizing plane in front to position where the current of air from the propeller would strike it, there would be a tendency for the aeroplane to tilt forwardly.

I have provided an improved mechanism for giving the operator absolute control of all four of these stabilizing planes from a single lever, whereby the operator may cause any one or two adjacent stabilizing planes to be moved into the path of the air current from the propeller to offer greater resistance to said air currents than will be offered by the other stabilizing planes.

Figure 2:
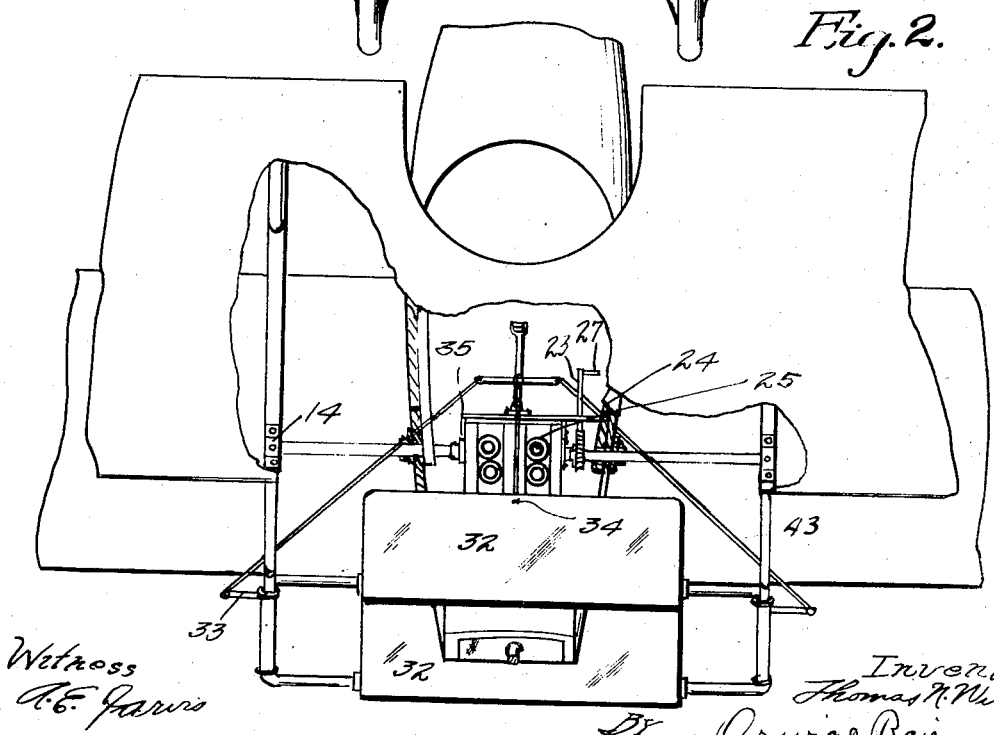
Fig. 2 shows a top or plan view of the parts shown in Fig. 1; parts being broken away to better illustrate the construction.

The means by which this is accomplished is clearly illustrated in Figs. 2 and 4 of the drawings. Referring to Fig. 4, it will be seen that the stabilizing plane lever is fulcrumed by a universal joint to the fuselage, and that it has arms extending outwardly in four directions at right angles to the lever, which arms extend outwardly to a considerable distance. Connected to these arms are the rods 43 and 44, which in turn operate the stabilizing planes to swing them on their pivots.

Referring particularly to Fig. 2 of the drawings, and assuming that the operating lever has its upper end pivoted toward the left, then obviously the movement of the outer end of the arm 40 will be in a segment centered at the fulcrum of the operating lever, and this will be substantially in a direction in line with the longitudinal axis of the rod 43, which is attached to the outer end of said arm, so that the entire movement of the arm will be in a direction tending to pull almost straight upon the rod with which it is connected. However, the opposite stabilizing plane will not be given the same movement, for the reason that the arm 40 to the left will have its outer end move downwardly and toward the vertical center of the fuselage, and this movement obviously will not give so much longitudinal movement to the rod as will the movement of the arm 40 to the right, just before described, and the result will be that the stabilizing plane on the right will be moved to position where it will be engaged by the current of air from the propeller to a much greater extent than will the stabilizing plane on the left, and hence there will be a tendency for the fuselage to be tilted toward the right, on account of the fact that the current of air is impinging upon the right stabilizing plane to a greater extent than upon the left.

This same movement applies when the operating lever is moved toward a point at the ends of two adjacent stabilizing planes, because in such case the two planes on the side opposite from the side toward which the stabilizing lever is moved, will be moved into the path of the air current from the propeller, while the two planes toward which the lever is moving will not be moved so much into the path of the air current, so that the operator has perfect control of the movement of these stabilizing planes to prevent the fuselage from tilting too far in any direction, and enabling the operator to hold the fuselage, if he desires, in a position with its upper end free from the ground and its rear end resting on the ground.

Some changes may be made in the construction and arrangement of the parts of my device without departing from the essential features and purposes thereof, and it is my intention to cover by my claims any modified forms of structure or use of mechanical equivalents which may be included within the scope of my claims.

I claim as my invention:

1. In an aeroplane, the combination of a fuselage, an airfoil at the forward portion thereof, a propeller in front of the airfoil, means for jointly moving the propeller shaft and the airfoil to position approaching a right angle vertically relative to the rear portion of the fuselage, a series of stabilizing planes arranged in the path of the air currents set up by the propeller, and a single controlling means for said stabilizing planes, said controlling means being so arranged that when a stabilizing plane on one side is moved to position where it will receive considerable impact from the air current from the propeller, the corresponding stabilizing plane on the opposite side will be so moved that it will not present so great resistance to the air current from the propeller, for the purposes stated.

2. In an aeroplane, the combination of a fuselage, an airfoil at the forward portion thereof, a propeller in front of the airfoil, means for jointly moving the propeller shaft and the airfoil to position approaching a right angle vertically relative to the rear portion of the fuselage, a series of stabilizing planes arranged in the path of the air currents set up by the propeller, and a single controlling means for said stabilizing planes, comprising a lever fulcrumed to the fuselage for universal movement, a number of arms extending outwardly from the lever substantially at right angles thereto, at points between the fulcrum and the outer end of the lever, and rods attached to said arms and to the said stabilizing planes, and extended from the ends of the said arms toward their points of attachment to the stabilizing planes at such angles that when the lever is moved in position directly away from one of the stabilizing planes, the rod connected to said stabilizing plane will be moved substantially in a longitudinal direction, while the rod attached to the stabilizing plane on the opposite side will be moved through an angle considerably divergent from the longitudinal line of the rod, and whereby the latter stabilizing plane will not be moved into the path of travel of the air current from the propeller so much as the former one, for the purposes stated.

THOMAS N. WILSON,